Patented Mar. 10, 1936

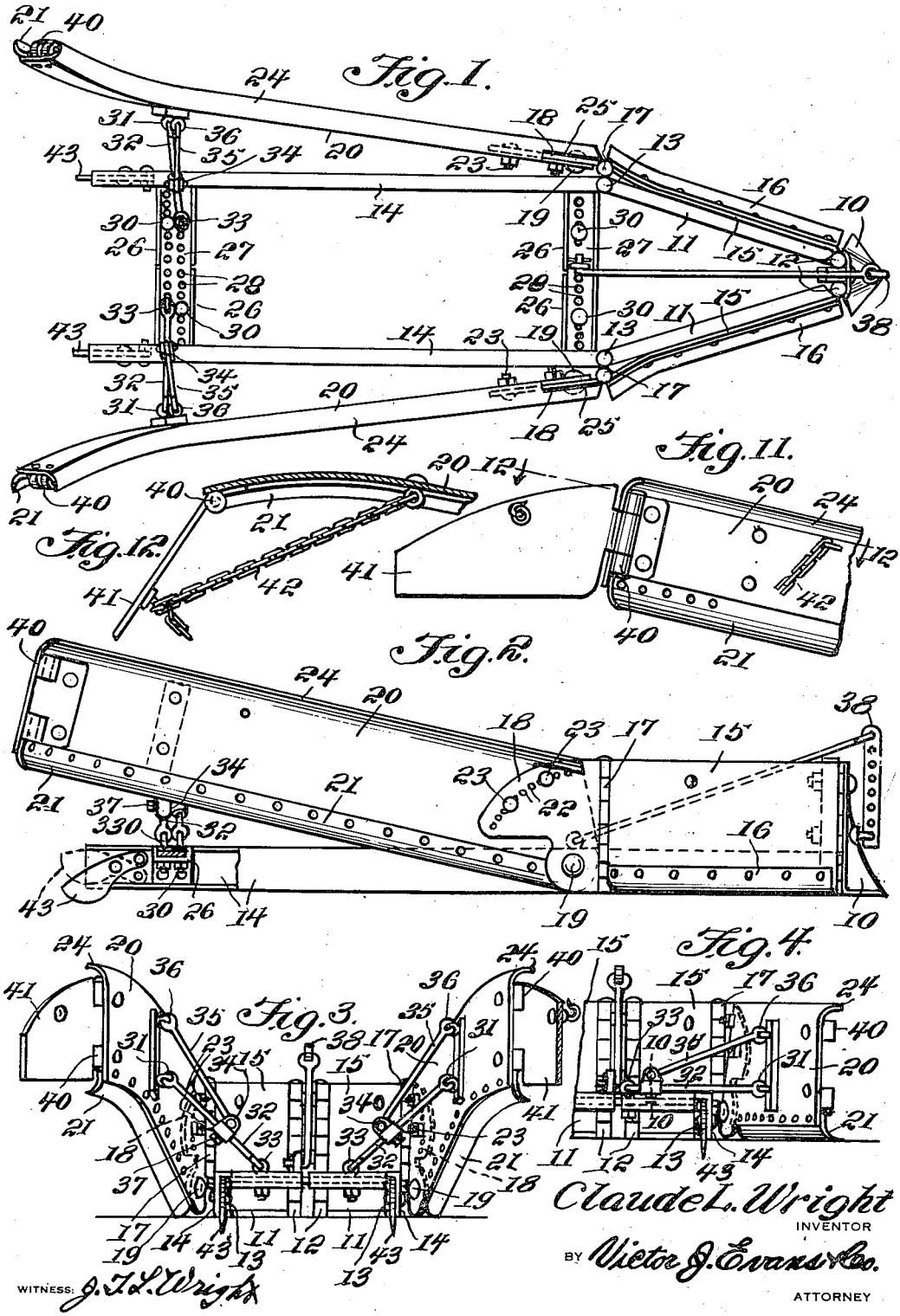

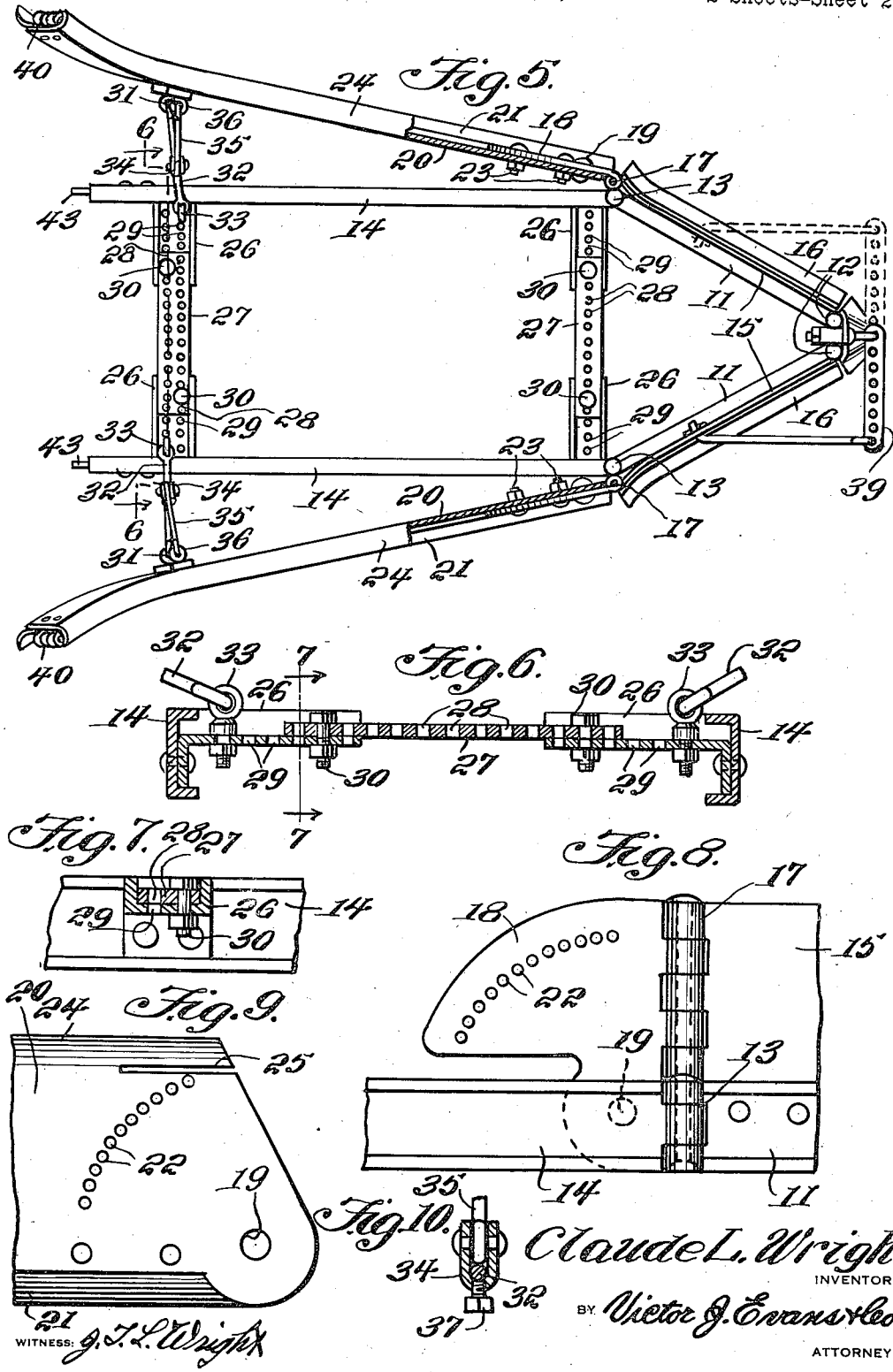

2,033,168

REISSUED

UNITED STATES PATENT OFFICE 2,033,168

DITCHER

Claude L. Wright, Harper, Oreg.

Application March 25, 1935, Serial No. 12,913

6 Claims. (Cl. 37—98)

The invention relates to a ditching machine and more especially to an apparatus for making ditches and cleaning the same, especially those in irrigated districts.

The primary object of the invention is the provision of a machine of this character, wherein a flat bottom ditch can be completed in a single operation or in the advancing of the machine in one direction and also that will ride level and requires but little effort to keep the same in a straight and level path.

Another object of the invention is the provision of a machine of this character, wherein the construction thereof is such as to enable the cleaning of irrigating ditches and the tractor with which it is used may be kept clear of the ditch and such machine will stay flat in the ditch even when subjected to side draft.

A further object of the invention is the provision of a machine of this character, wherein it is susceptible of a wide range of adjustment and will operate for the making of a ditch or the cleaning thereof and in the operation will level the banks at opposite sides of the ditch.

A still further object of the invention is the provision of a machine of this character, which is extremely simple in its construction, thoroughly reliable and efficient in its operation, convenient for use, strong, durable, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereinto appended.

In the accompanying drawings:

Figure 1 is a top plan view of the machine constructed in accordance with the invention.

Figure 2 is a side elevation thereof partly broken away.

Figure 3 is a rear elevation.

Figure 4 is a fragmentary rear elevation showing an adjustment of the machine.

Figure 5 is a top plan view partly broken away and showing an adjustment of the hitch.

Figure 6 is a sectional view on the line 6—6 of Figure 5 looking in the direction of the arrows.

Figure 7 is a sectional view on the line 7—7 of Figure 6 looking in the direction of the arrows.

Figure 8 is a fragmentary detailed side elevation.

Figure 9 is a fragmentary side elevation of one of the mould plates.

Figure 10 is a sectional view on the line 10—10 of Figure 4.

Figure 11 is a fragmentary elevation showing a bank leveling wing.

Figure 12 is a sectional view on the line 12—12 of Figure 11 looking in the direction of the arrows.

Similar reference characters indicate corresponding parts throughout the several views in the drawings.

Referring to the drawings in detail, the machine in its preferred embodiment comprises a plow share or member 10 made secure in any suitable manner to the forwardly converging front runner sections 11 which are connected by hinges 12 rearwardly of the share or member 10 and also connected by hinges 13 to the rear runner sections 14 these being preferably arranged in spaced parallel relation to each other and are of U-irons. The sections 11 at their outer sides have riveted or otherwise secured thereto mould plates 15 these carrying at their lower ends outwardly curled scraping cutter blades 16. Connected with the rear ends of the mould plates 15 by hinges 17 are substantially segmental shaped leaves 18 to which are pivoted at 19 vertical swinging rear mould plates 20 these having at their lowermost edges scraper or cutter blades 21 which are curled outwardly similar to the blades 16. The leaves 18 and the mould plates 20 are provided with matching apertures 22 for accommodating detachable fasteners 23 so that the plates 20 can be made secure in vertically adjusted position or secured to operate in the same plane with the plates 15. The plates 20 have the outturned upper edges 24 and each is also provided with a clearance slot 25 for the companion leaf 18 so that there will be no interference in the vertical upward swing of the plate 20 on adjustment thereof.

The rear runners 14 carry fore and aft thereof channeled brackets 26 with which are fitted adjustable tie plates 27, these being provided with apertures 28 and likewise the brackets for the apertures 29 companions thereto for accommodating fasteners 30 for the adjustable coupling of the plates 27 with said brackets and in this fashion the runners may be disposed at the desired distance apart for regulating the spread of the ditching machine.

The mould plates 18 carry eyes 31 engaged by links 32 these being engaged with adjustable eyes 33 mounted in the brackets 26 rearmost of the runners 14. These links have fitted therewith adjustable slides 34 to which are pivoted braces 35 which are connected with the eyes 36 on the plates 18 and elevated with relation to the eyes 31. The slides 34 are fitted with set screws 37 for securing the same adjusted on the links 32.

At the front of the machine is carried a vertical hitch 38 for a tractor or other draft machinery.

In Figure 5 of the drawings the machine at the front has connected therewith the horizontally arranged hitch 39 for side draft purposes.

Connected with the rear ends of the plates 20 by hinges 40 are bank scraping wings 41, each having adjustably connected therewith a stay chain 42 which is connected with the companion plate 20.

At the rear ends of the runners 14 are pivotally supported equalizer members 43 which function as calks to steady the machine thereof as will be apparent from Figures 2, 3 and 4 of the drawings.

It will appear that the machine can be adjusted for lateral spread thereof and also the mould plates 20 can be vertically adjusted so as to have the wings 41 scrape and level the banks at opposite sides of a ditch as formed by the machine or as cleaned thereby.

If found desirable, the inner runners 14 instead of being pivoted for lateral swing, as at 13, they may be made rigid and maintained in parallel relation to each other, this being optional.

What is claimed is:

1. A machine of the character described, comprising a plow share, front runners pivotally connected with said share, rear runners pivotally connected to said front runners, means between the rear runners for permitting lateral adjustment thereof, mould plates carried by the front runners and having outturned blades at their lower edges, rear mould plates laterally and vertically movable with respect to said first-named mould plates, cutting blades at the lower edges of the last-named mould plates, and links adjustably connecting the rear mould plates with the rear runners.

2. A machine of the character described, comprising a plow share, front runners pivotally connected with said share, rear runners pivotally connected to said front runners, means between the rear runners for permitting lateral adjustment thereof, mould plates carried by the front runners and having outturned blades at their lower edges, rear mould plates laterally and vertically movable with respect to said first-named mould plates, cutting blades at the lower edges of the last-named mould plates, links adjustably connecting the rear mould plates with the rear runners and means for securing the rear mould plates in vertically adjusted position.

3. A machine of the character described, comprising a plow share, front runners pivotally connected with said share, rear runners pivotally connected to said front runners, means between the rear runners for permitting lateral adjustment thereof, mould plates carried by the front runners and having outturned blades at their lower edges, rear mould plates laterally and vertically movable with respect to said first-named mould plates, cutting blades at the lower edges of the last-named mould plates, links adjustably connecting the rear mould plates with the rear runners, means for securing the rear mould plates in vertically adjusted position and scraper wings adjustably connected with the rear mould plates at their rear ends.

4. A machine of the character described, comprising a plow share, front runners pivotally connected with said share, rear runners pivotally connected to said front runners, means between the rear runners for permitting lateral adjustment thereof, mould plates carried by the front runners and having outturned blades at their lower edges, rear mould plates laterally and vertically movable with respect to said first-named mould plates, cutting blades at the lower edges of the last-named mould plates, links adjustably connecting the rear mould plates with the rear runners, means for securing the rear mould plates in vertically adjusted position, scraper wings adjustably connected with the rear mould plates at their rear ends and equalizer members carried by the rear runners.

5. A machine of the character described, comprising a plow share, front runners pivotally connected with said share, rear runners pivotally connected to said front runners, means between the rear runners for permitting lateral adjustment thereof, mould plates carried by the front runners and having outturned blades at their lower edges, rear mould plates laterally and vertically movable with respect to said first-named mould plates, cutting blades at the lower edges of the last-named mould plates, links adjustably connecting the rear mould plates with the rear runners, means for securing the rear mould plates in vertically adjusted position, scraper wings adjustably connected with the rear mould plates at their rear ends, equalizer members carried by the rear runners, slides adjustably mounted on the links and connections between the slides and said rear mould plates.

6. A machine of the character described, comprising a plow share, front runners pivotally connected with said share, rear runners pivotally connected to said front runners, means between the rear runners for permitting lateral adjustment thereof, mould plates carried by the front runners and having outturned blades at their lower edges, rear mould plates laterally and vertically movable with respect to said first-named mould plates, cutting blades at the lower edges of the last-named mould plates, links adjustably connecting the rear mould plates with the rear runners, means for securing the rear mould plates in vertically adjusted position, scraper wings adjustably connected with the rear mould plates at their rear ends, equalizer members carried by the rear runners, slides adjustably mounted on the links, connections between the slides and said rear mould plates and a hitch adjustably connected with the forward end of said machine.

CLAUDE L. WRIGHT.